United States Patent Office 3,413,368
Patented Nov. 26, 1968

---

3,413,368
DEHYDROGENATION OF ORGANIC COMPOUNDS
William L. Fierce, Crystal Lake, Ill., assignor to Union Oil Company of California, Los Angeles, Calif., a corporation of California
No Drawing. Filed Aug. 13, 1965, Ser. No. 479,637
2 Claims. (Cl. 260—666)

This invention relates to a process for dehydrogenating cyclohexane to cyclohexene by means of nitrogen dioxide in the absence of catalysts.

Although the dehydrogenation of saturated hydrocarbons by means of oxygen to olefins is known and although the oxidation of cyclohexane to adipic acid by means of nitrogen peroxide is known, to the best of applicant's knowledge the prior art does not teach that cyclohexane can be dehydrogenated to cyclohexene by means of nitrogen dioxide.

I have discovered that cyclohexane can be dehydrogenated to cyclohexene by reacting with nitrogen dioxide at elevated temperatures of about 350° C. to 650° C. I have further discovered that the reaction proceeds more smoothly in the absence of catalysts than in the presence of catalysts.

The specific reaction with cyclohexane is:

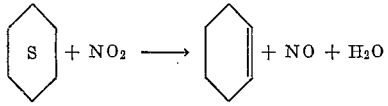

The reaction may be carried out at ordinary atmospheric pressure but may also be carried out at superatmospheric or subatmospheric pressure.

It will be apparent that the nitric oxide formed as a reaction product may be re-oxidized back to nitrogen dioxide by means of oxygen and recycled to the process. The dehydrogenated product may be recovered from the reaction mixture by conventional methods of distillation and fractionation.

In order to suppress the formation of undesirable by-products it is desirable to have an excess of cyclohexane over that necessary to stoichiometrically react with the $NO_2$. I have found that when the mol ratio of cyclohexane to the $NO_2$ is about from 1.5 mols of the former to 1 mol of the latter to about 2 mols of the former to 1 mol of the later, satisfactory results are obtained. Gaseous hourly space velocity is not critical and may range, for example, from 50 to 200.

In order to demonstrate the invention a series of runs was made in which a mixture of helium, cyclohexane and nitrogen dioxide was passed through a heated empty Vycor reactor tube having a volume of 87 cc. in the heated zone. The reaction products from the reactor were passed through a condenser into a receiver cooled by ice water, thence through a Dry Ice-acetone trap and a gas sample tube. All liquid and gaseous products were analyzed by means of a mass spectrometer. The data on three runs made as just described is given in the following table.

TABLE I

| Run No. | A | B | C |
|---|---|---|---|
| Duration (minutes) | 60 | 60 | 53 |
| Temperature (° C.) | 348–353 | 449–451 | 547–551 |
| Helium flow (cc./min.) | 50 | 50 | 50 |
| Mol ratio of cyclohexane/$NO_2$ | 1.89 | 1.82 | 1.53 |
| Gaseous hourly space velocity of total charge gas | 103.5 | 105 | 95.5 |
| Cyclohexane conversion (percent by wt.) | 2.1 | 10.5 | 25.2 |
| Cyclohexene yield (percent by wt.) | 0.1 | 6.4 | 15.4 |
| Cyclohexene selectivity (percent by wt.) | 5.9 | 61.2 | 61.2 |

In the foregoing table the cyclohexene yield is based on the cyclohexane charged. Selectivity is based on the cyclohexane consumed. Thus, a selectivity of 61.2 means that of the cyclohexane consumed in the reaction 61.2% by weight was converted to cyclohexene.

Althoguh the runs shown in the foregoing table were all made in the presence of helium, the reaction can be carried out in the absence of a diluent gas. However, I prefer to carry out the reaction in the presence of an inert diluent gas, such as nitrogen, argon or helium in order to minimize any tendency toward side reactions which might detract from yield and selectivity. Where a diluent gas is used, the amount of such gas may be in the range of approximately 50 to 100% by volume of the reacting gases charged to the reactor.

It will be seen from the foregoing table that the conversion, yield and selectivity are low at temperatures of around 350° C. As the temperature increases the conversion and yield increase but the selectivity remains substantially the same at 450° C. and 550° C. As the temperature is increased above 600° C. greater amounts of by-products are produced, including carbon monoxide, carbon dioxide, benzene, cyclohexadiene and toluene. I prefer, therefore, to operate the process within the range of about 450–600° C.

Although the process can be carried out in the presence of a catalyst, such as magnesium chloride supported on pumice, inferior results are obtained to those which are obtained when no catalyst is used. I prefer, therefore, to carry out the reaction in the absence of a catalyst.

The embodiments of the invention in which an exclusive propery or privilege is claimed are defined as follows:

1. A method for dehydrogenating cyclohexane to produce cyclohexene, which consists in reacting cyclohexane with a dehydrogenating agent consisting essentially of nitrogen dioxide at a temperature of about 547–551° C., the mole-ratio of cyclohexane/$NO_2$ being about 1.5/1 and 2/1.

2. A method as defined in claim 1 wherein the mole-ratio of cyclohexane/$NO_2$ is about 1.5.

References Cited

UNITED STATES PATENTS

| 2,188,638 | 1/1940 | Atwell | 260—683.3 |
| 2,126,817 | 8/1938 | Rosen | 260—683.3 |
| 2,143,014 | 1/1939 | Klein | 260—683.3 |
| 2,660,032 | 11/1953 | Rosenthal | 260—683.3 |
| 2,772,315 | 11/1956 | Hadden | 260—683.3 |
| 2,692,292 | 10/1954 | Robinson | 260—666 |

DELBERT E. GANTZ, *Primary Examiner.*

V. O'KEEFE, *Assistant Examiner.*